(12) United States Patent (10) Patent No.: US 12,565,570 B2
Lewczyk et al. (45) Date of Patent: Mar. 3, 2026

(54) FOAM MANUFACTURING TECHNIQUES

(71) Applicant: Cruz Foam, Inc., Santa Cruz, CA (US)

(72) Inventors: William Thomas Lewczyk, Santa Cruz, CA (US); Grant Scott Logan, Paradise Valley, AZ (US)

(73) Assignee: Cruz Foam, Inc., Santa Cruz, CA (US)

( * ) Notice: Subject to any disclaimer, the term of this patent is extended or adjusted under 35 U.S.C. 154(b) by 670 days.

(21) Appl. No.: 17/959,930

(22) Filed: Oct. 4, 2022

(65) Prior Publication Data

US 2023/0105284 A1 Apr. 6, 2023

Related U.S. Application Data

(60) Provisional application No. 63/251,839, filed on Oct. 4, 2021.

(51) Int. Cl.
*C08J 9/12* (2006.01)
*B29C 44/34* (2006.01)
(Continued)

(52) U.S. Cl.
CPC ............. *C08J 9/12* (2013.01); *B29C 44/3415* (2013.01); *C08J 9/0023* (2013.01); *C08J 9/0028* (2013.01);
(Continued)

(58) Field of Classification Search
CPC ............... C08J 9/00; C08J 9/04; C08J 9/0066
See application file for complete search history.

(56) References Cited

U.S. PATENT DOCUMENTS 5,011,864 A 4/1991 Nielsen et al.
5,256,702 A 10/1993 Grigat et al.
(Continued)

FOREIGN PATENT DOCUMENTS

CN 1112143 A 11/1995
CN 1410452 A 4/2003
(Continued)

OTHER PUBLICATIONS

Invitation to Pay Additional Fees And, Where Applicable, Protest Fee, mailed Dec. 14, 2022, in corresponding International Patent Application No. PCT/US2022/77532, 2 pages.
(Continued)

*Primary Examiner* — Robert A Vetere
(74) *Attorney, Agent, or Firm* — Christensen O'Connor Johnson Kindness PLLC

(57) ABSTRACT

A method of foam production is described. The method includes providing a foam precursor including one or more components, the one or more components including at least one of chitin, chitosan, or chitosan oligosaccharide and a solvent. The method further comprises exposing the foam precursor to radiation. The radiation is of a wavelength to heat the foam precursor. A system for foam produced is described, the system including a mixer configured to output a foam precursor including one or more components. The one or more components include at least one of chitin, chitosan, or chitosan oligosaccharide. The system further includes a radiation emitting system positioned to receive the foam precursor from the mixer and expose the foam precursor to radiation to heat the foam precursor to form a solid foam.

12 Claims, 9 Drawing Sheets

400

(51) Int. Cl.
  *C08J 9/00*        (2006.01)
  *C08L 5/08*        (2006.01)

(52) U.S. Cl.
  CPC ........... *C08J 9/0061* (2013.01); *C08J 9/0066*
        (2013.01); *C08L 5/08* (2013.01); *B29K*
      *2005/00* (2013.01); *C08J 2305/08* (2013.01);
                  *C08L 2203/14* (2013.01)

(56)            References Cited

U.S. PATENT DOCUMENTS

| | | | |
|---|---|---|---|
| 5,756,111 | A | 5/1998 | Yoshikawa et al. |
| 7,041,369 | B1 | 5/2006 | Mackey et al. |
| 8,114,919 | B2 | 2/2012 | Weidinger |
| 2001/0014702 | A1 | 8/2001 | Harfmann et al. |
| 2003/0021921 | A1 | 1/2003 | Debraal et al. |
| 2003/0143388 | A1 | 7/2003 | Reeves et al. |
| 2003/0155679 | A1 | 8/2003 | Reeves et al. |
| 2004/0197545 | A1 | 10/2004 | Gehlsen et al. |
| 2005/0202229 | A1 | 9/2005 | Ozasa et al. |
| 2006/0293418 | A1 | 12/2006 | Matuana et al. |
| 2007/0292643 | A1 | 12/2007 | Renn |
| 2008/0166385 | A1 | 7/2008 | Durance et al. |
| 2009/0214853 | A1 | 8/2009 | Quist et al. |
| 2009/0263601 | A1 | 10/2009 | Renn |
| 2011/0059162 | A1 | 3/2011 | Reed et al. |
| 2012/0077012 | A1 | 3/2012 | Liu et al. |
| 2013/0287836 | A1 | 10/2013 | Ingber et al. |
| 2014/0256925 | A1 | 9/2014 | Catchmark et al. |
| 2015/0057368 | A1 | 2/2015 | Connelly et al. |
| 2015/0299383 | A1 | 10/2015 | Trumbo et al. |
| 2015/0374877 | A1 | 12/2015 | Guo et al. |
| 2016/0168311 | A1 | 6/2016 | Cuero Rengifo et al. |
| 2016/0207251 | A1 | 7/2016 | Cik |
| 2020/0239670 | A1 | 7/2020 | Rolandi et al. |
| 2021/0238393 | A1 | 8/2021 | Zhang et al. |

FOREIGN PATENT DOCUMENTS

| | | | | |
|---|---|---|---|---|
| CN | 1628865 | A | 6/2005 | |
| CN | 1800249 | A | 7/2006 | |
| CN | 101381500 | A | 3/2009 | |
| CN | 101974189 | A | 2/2011 | |
| CN | 101654537 | B | 3/2011 | |
| CN | 101301491 | B | 6/2011 | |
| CN | 103012836 | A | 4/2013 | |
| CN | 103709452 | A | 4/2014 | |
| CN | 104558677 | A | 4/2015 | |
| EP | 0747420 | A1 | 12/1996 | |
| EP | 3487922 | A1 | 5/2019 | |
| EP | 3794068 | A1 | 3/2021 | |
| KR | 960004436 | B1 | 6/1993 | |
| WO | 2012030805 | A2 | 3/2012 | |
| WO | WO-2013131079 | A1 * | 9/2013 | ............ B29C 67/00 |
| WO | 2018017837 | A1 | 1/2018 | |
| WO | WO-2019217268 | A1 * | 11/2019 | ........... C08J 9/0023 |

OTHER PUBLICATIONS

Microwave Oven, Wikipedia, 2013, https://en.wikipedia.org/wiki/Microwave_oven, 24 pages.

Zubair, et al., Microwave Foaming of Materials: an Emerging Field, Polymers, https://doi.org/10.3390/polym12112477, 31 pages.

International Search Report and Written Opinion, mailed Feb. 27, 2023, in corresponding International Patent Application No. PCT/US2022/77532, 12 pages.

Emilia Szymańska, et al, Stability of Chitosan—A Challenge for Pharmaceutical and Biomedical Applications, Marine Drugs, Published Apr. 1, 2015, vol. 13, pp. 1819-1846.

Duan, Natural Macromolecules (Chinese), Huazhong University of Science and Technology Press, Edition 1, p. 192, Mar. 31, 2016.

Beijing Plastic Industry School, China Light Industry Press, Plastic Molding Equipment 1st Addition, Aug. 31, 2007, pp. 1-4 (pp. 115-116).

ASTM Int'l Standard Designation: D1621-10, Standard Test Method for Compressive Properties of Rigid Cellular Plastics, Apr. 2010, 5 pages.

ASTM Int'l Standard Designation: D1622/D1622M-14, Standard Test Method for Apparent Density of Rigid Cellular Plastics, Apr. 2014, 4 pages.

ASTM Int'l Standard Designation: D1623-09, Standard Test Method for Tensile and Tensile Adhesion Properties of Rigid Cellular Plastics, Sep. 2009, 7 pages.

ASTM Int'l Standard Designation: D3575-20, Standard Test Methods for Flexible Cellular Materials Made from Olegin Polymers, Feb. 2020, 11 pages.

ASTM Int'l Standard Designation: D3576-15, Standard Test Method for Cell Size of Rigid Cellular Plastics, Oct. 2015, 5 pages.

ASTM Int'l Standard Designation: D6226-15, Standard Test Method for Open Cell Content of Rigid Cellular Plastics, Sep. 2015, 7 pages.

Banerjee et al., Alginate-chitosan composite hydrogel film with macrovoids in the inner layer of biomedical applications, J. Appl. Polym. Sci., Jun. 10, 2019, 9 pages.

Calles-Arriaga et al., Thermal characterization of microwave assisted foaming of expandable polystyrene, Ingenieria investigacion y tecnologia, Jan. 2016, 7 pages.

Castel-Molieres et al., Influence of Homogenization Technique and Blend Ratio on Chitosan/Aliginate Polyelectrolyte Complex Properties, Journal of Medicine and Biological Engineering, v. 38(1); Feb. 2018, pp. 10-21.

Flagel, Mycelium: Using Mushrooms to Make Packaging Materials, https://matmatch.com/blog, Apr. 3, 2020, 21 pages.

Makarios-Laham et al., Biodegradability of chitin- and chitosan-containing films in soil environment, J. Environ Polym Degr 3, (1), Jan. 1995, 6 pages.

Mohandas et al., Exploration of alginate hydrogel/nano zinc oxide composite bandages for infected wounds, International Journal of Nanomedicine Oct. 1, 2015, pp. 53-66.

Li et al., Chitosan-Alginate Nanoparticles as a Novel Drug Delivery System for Nifedipine, International Journal of Biomedical Science, vol. 4, No. 3, Sep. 2008, pp. 221-228.

Rudyardjo et al., The Synthesis and characterization of hydrogel chitosan-alginate with the addition of plasticizer auric acid for wound dressing application, in Journal of Physics: Conference Series May 1 (vol. 853, No. 1, p. 012042) IOP Publishing, 8 pages.

Shigemasa et al., Evaluation of different absorbance ratios from infrared spectroscopy for analyzing the degree of deacetylation in chitin, International Journal of Biological Macromolecules, 18(3) Apr. 1, 1996, 237-42.

Zhao et al., Preparation of Fibrous Chitosan/Sodium Alginate Composite Foams for the Absorption of Cationic and Anionic Dyes, Journal of Hazardous Materials vol. 403, Sep. 22, 2020, pp. 1-10.

\* cited by examiner

205

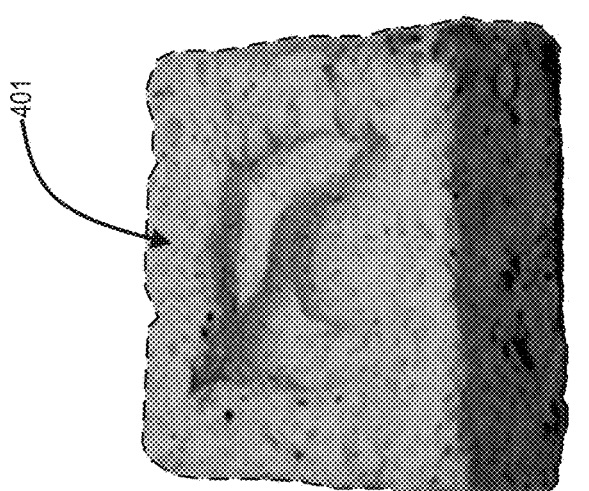
401
400
FIG. 4

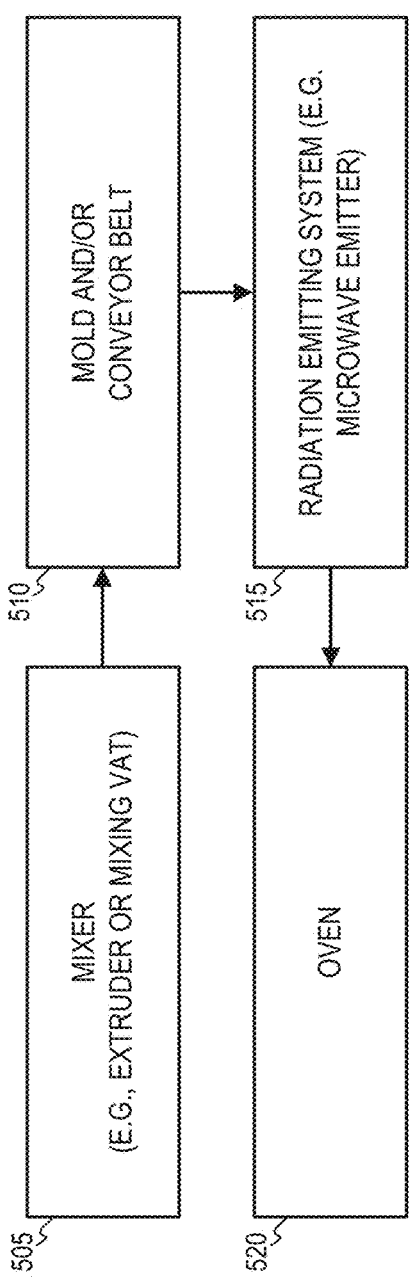
500
505    MIXER
(E.G., EXTRUDER OR MIXING VAT)
510    MOLD AND/OR
CONVEYOR BELT
515    RADIATION EMITTING SYSTEM (E.G.
MICROWAVE EMITTER)
520    OVEN
FIG. 5

600

601

650

601

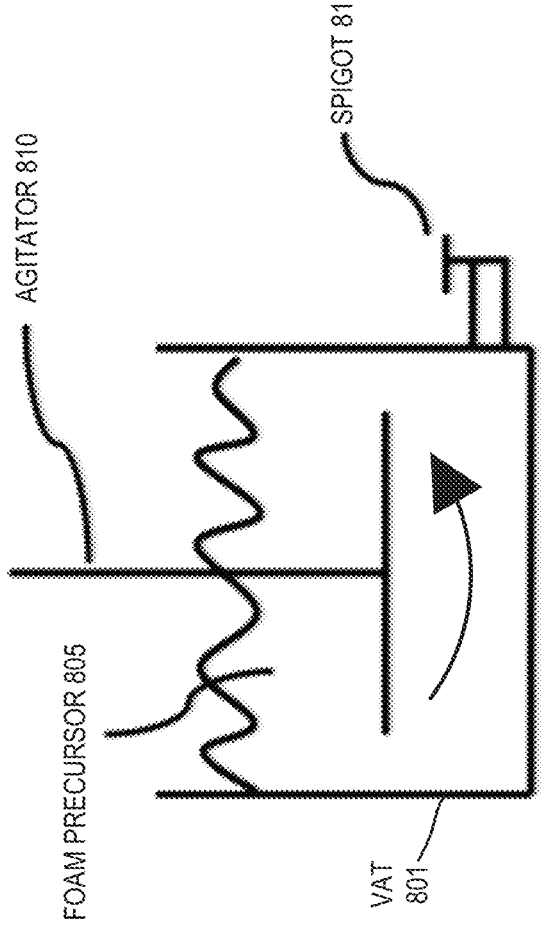
FIG. 8

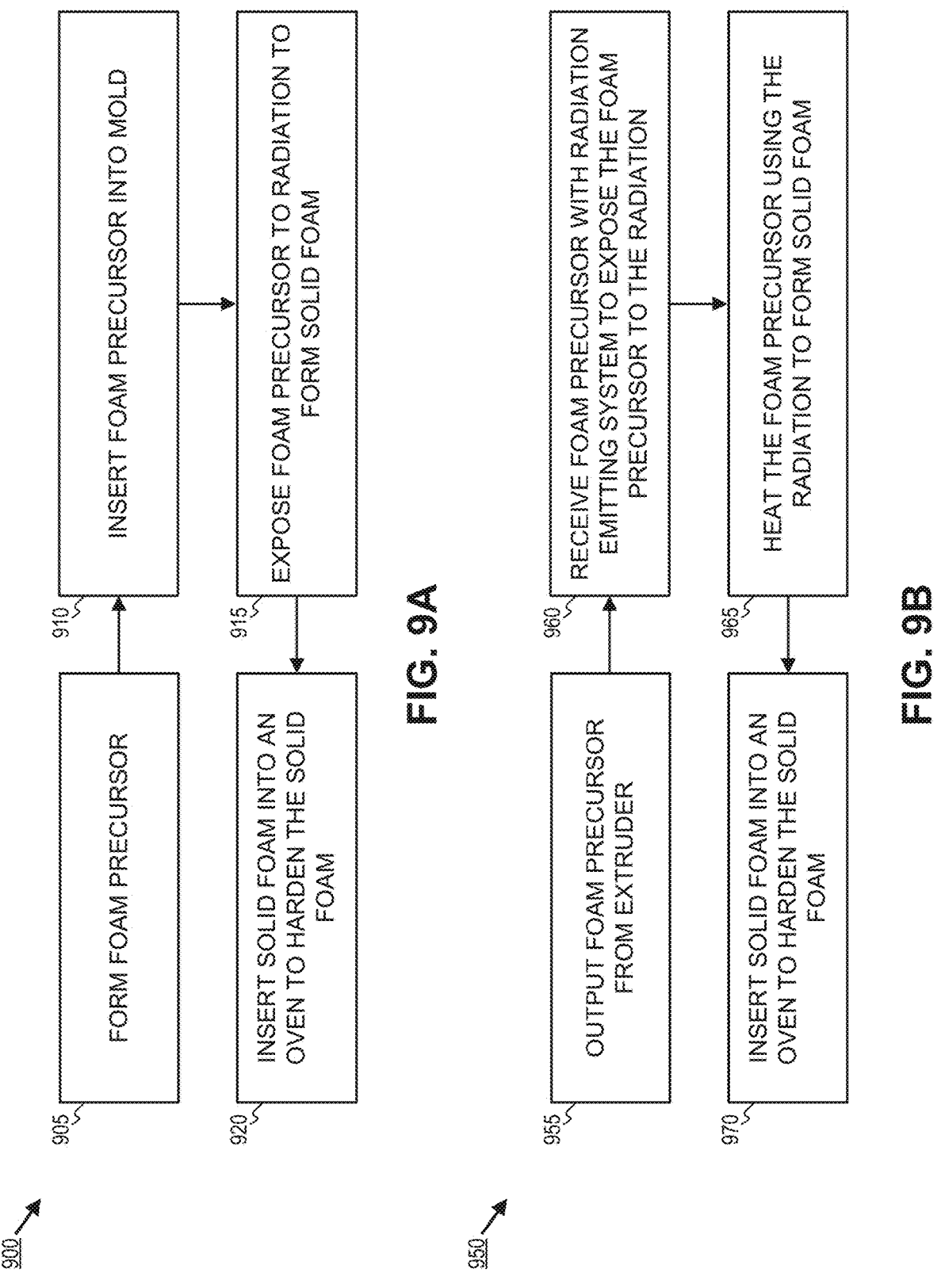

FIG. 9A

905 — FORM FOAM PRECURSOR

910 — INSERT FOAM PRECURSOR INTO MOLD

915 — EXPOSE FOAM PRECURSOR TO RADIATION TO FORM SOLID FOAM

920 — INSERT SOLID FOAM INTO AN OVEN TO HARDEN THE SOLID FOAM

955 — OUTPUT FOAM PRECURSOR FROM EXTRUDER

960 — RECEIVE FOAM PRECURSOR WITH RADIATION EMITTING SYSTEM TO EXPOSE THE FOAM PRECURSOR TO THE RADIATION

965 — HEAT THE FOAM PRECURSOR USING THE RADIATION TO FORM SOLID FOAM

970 — INSERT SOLID FOAM INTO AN OVEN TO HARDEN THE SOLID FOAM

950

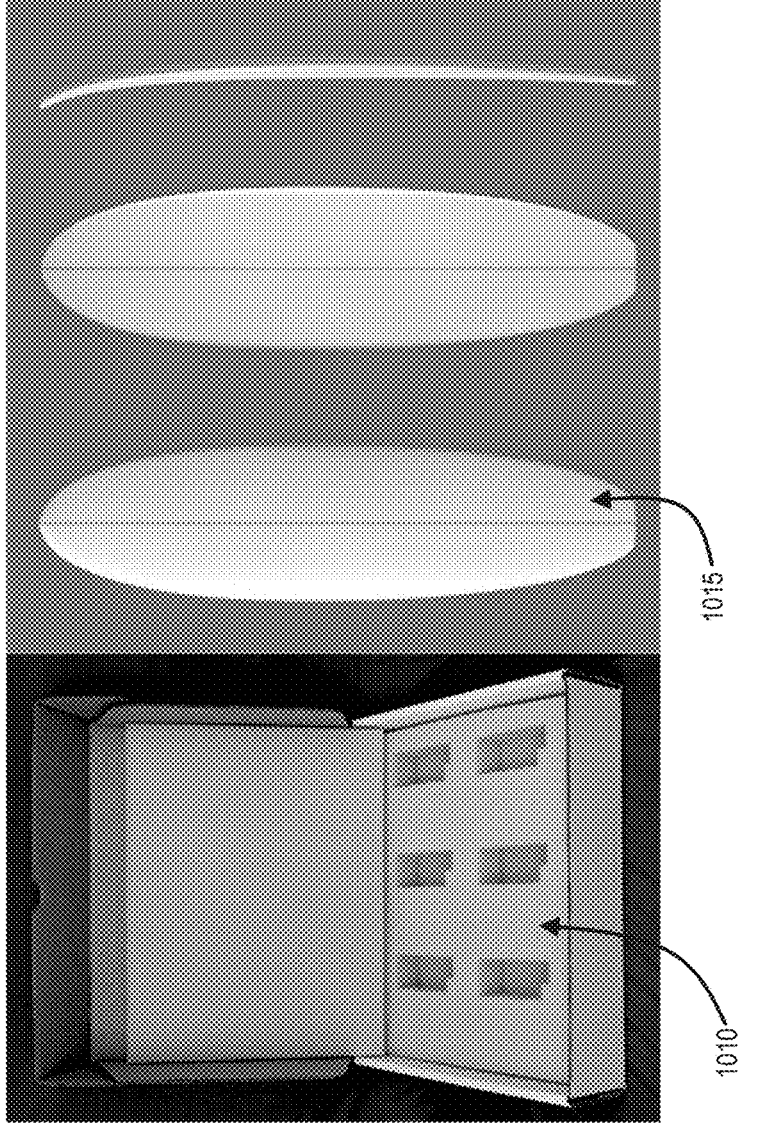
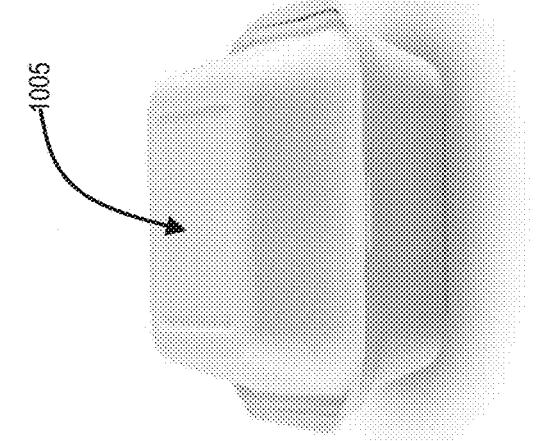
1000
FIG. 10

FOAM MANUFACTURING TECHNIQUES

CROSS-REFERENCE TO RELATED APPLICATION

This application claims the benefit of U.S. Provisional Application No. 63/251,839, filed on Oct. 4, 2021, which is hereby incorporated by reference in its entirety.

TECHNICAL FIELD

This disclosure relates generally to foam manufacturing and products, and in particular but not exclusively, relates to biodegradable foam manufacturing.

BACKGROUND INFORMATION

Plastic pollution is hazardous to life on earth. Plastic may take hundreds of years to degrade, may be ingested by animals and humans, and may cause health problems such as cancer. Plastic foams (e.g., expanded polystyrene) are ubiquitously used as packaging materials and significantly contribute to environmental plastic pollution.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIG. 4 shows a view illustrating an example piece of foam formed using a mold at a 2-step heating method, in accordance with embodiments of the present disclosure.

FIG. 5 illustrates a system for foam production, in accordance with embodiments of the present disclosure.

FIG. 8 illustrates an example mixing vat, in accordance with embodiments of the present disclosure.

FIGS. 9A-9B illustrate example methods of foam production, in accordance with embodiments of the present disclosure.

FIG. 10 illustrates example products with a three-dimensional shape produced with the foam formed with the manufacturing techniques described in embodiments of the present disclosure.

DETAILED DESCRIPTION

Figure 1:
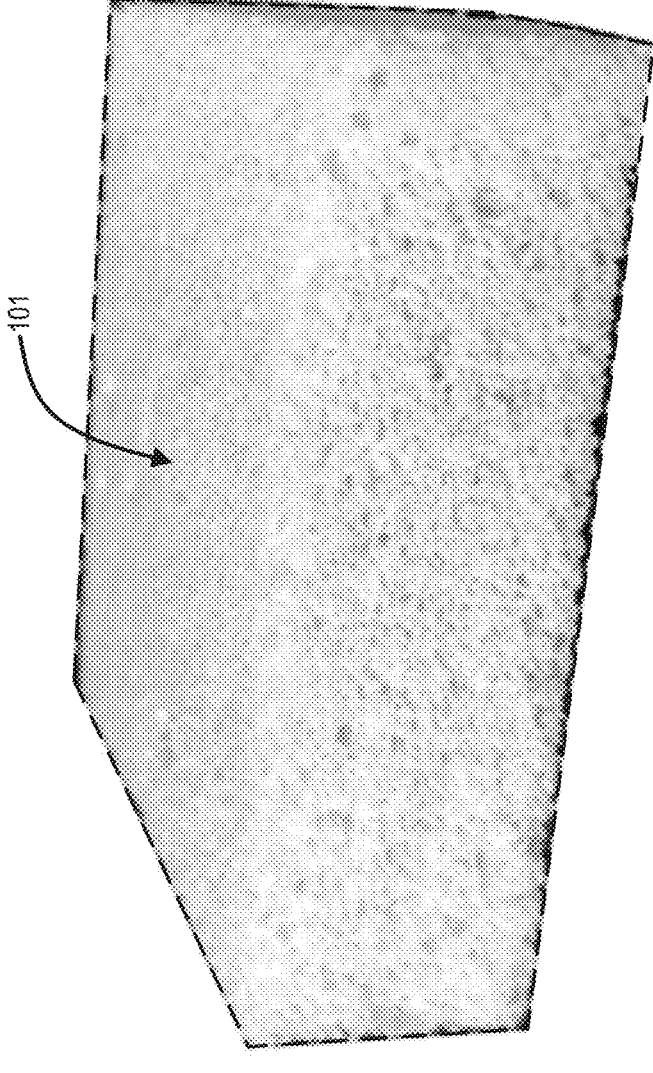
FIG. 1 illustrates a view of an example biodegradable foam with using the ingredients and methods described herein, in accordance with embodiments of the present disclosure.

Set forth herein are non-toxic biodegradable foam formed with foam manufacturing techniques that solve the problems associated with conventional plastics and plastic foams. Specifically, described herein are techniques to use microwave technology as the baking medium for biodegradable foams made from at least one of chitin, chitosan, or chitosan oligosaccharide. By using microwave technology a significant reduction in baking time (e.g., the time it takes for the foam to dry and harden) is achieved.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning. It is appreciated that the wavelengths discussed herein may be used interchangeably with their energy equivalents, which are given by the following equation. The energy of light (or photon energy), E, is inversely proportional to the wavelength by the equation: $E=hc/l$, where "h" is Planck's constant $(6.6261 \times 10^{-34}$ J*s$)$ and "c" is the speed of light $(2.9979 \times 10^8$ m/s$)$ and "l" is wavelength.

Inorganic plastics and plastic foams are ubiquitous. Expanded polystyrene is regularly used as a packaging material. However, inorganic plastics and plastic foams have become a major environmental pollutant, do not biodegrade, use toxic non-renewable precursors, and may cause health problems such as cancer.

Described herein are precursors and methods of manufacturing which may be used to make biodegradable nontoxic polymers and polymer foams. Petroleum-based foams suffer from many drawbacks. The foams described herein are biodegradable, nontoxic, and produced with nontoxic precursors and through environmentally friendly processes. As will be shown, these biodegradable foams represent a significant advancement over existing industrial foam technologies since the biodegradable foams have similar or better mechanical, chemical, and thermal properties than the petroleum-based foams, with none of the negative environmental impact.

The nontoxic polymers and polymer foams described herein may use renewable precursors and do biodegrade. Thus, the polymers (e.g., foam, and/or products made from the foam) and methods of manufacturing described in embodiments disclosed herein may solve at least some of the problems associated with conventional inorganic plastic foams and foam-based products. In particular, embodiments disclosed herein incorporate biodegradable foam manufacturing using a two-step heating process that incorporates microwave technology during a first heating step and an oven during a second heating step to provide a significant reduction in baking time (e.g., the time it takes for the foam to dry and harden).

FIG. 1 illustrates a view 100 of an example biodegradable foam 101 with using the ingredients and methods described herein, in accordance with embodiments of the present disclosure. In some embodiments, the foam has a low density (e.g., less than 1 g/cm$^3$, less than 0.5 g/cm$^3$, less than 0.3 g/cm$^3$, or less than 0.1 g/cm$^3$) due to most volume of the foam corresponding to air. It is appreciated that the foam 101 may be non-toxic and/or biodegradable materials to form comparable non-toxic and/or biodegradable products. The foam 101 may include any of chitin, chitosan, or chitosan oligosaccharide. When foam 101 includes multiple constituent components it may be referred to as a composite (e.g., a material made from two or more constituent materials). However, it is not required that foam 101 include other ingredients. The foam 101 may include a polymer matrix (e.g., from chitosan, chitosan oligosaccharide, or chitin) including monomer units of D-glucosamine and N-acetyl-D-glucosamine. In the depicted embodiment, the polymer matrix may include 70% or less N-acetyl-D-glucosamine. However, in other embodiments the polymer matrix may include 60% or less N-acetyl-D-glucosamine, 50% or less N-acetyl-D-glucosamine; 40% or less N-acetyl-D-glucosamine, 30% or less N-acetyl-D-glucosamine, 20% or less N-acetyl-D-glucosamine, or 10% or less N-acetyl-D-glucosamine. In some embodiments, a composition of the foam, by weight percent, includes a polymer matrix weight percent representative of the polymer matrix included in the foam. In some embodiments, the polymer matrix weight percent may correspond to or otherwise include at least one of a chitin weight percent or a chitosan weight percent (e.g., if the polymer matrix includes chitosan but not chitin, then the polymer matrix weight percent corresponds to the chitosan weight percent).

In some embodiments, the foam 101 may include a dispersed phase disposed or otherwise intermixed within the polymer matrix to form the foam 101, which may be a porous composite foam. In some embodiments, the composition of the foam 101 includes a dispersed phase weight percent representative of a dispersed phase included in the foam 101. In one embodiment, the polymer matrix weight percent and/or chitin or chitosan weight percentages are less than the dispersed phase weight percent. In some embodiments, the polymer matrix weight percent is between 0.5-3 times that of the dispersed phase weight percent. In other words, in some embodiments, the weight percent of the polymer matrix or the constituent components of the polymer matrix (e.g., chitosan weight percent, chitin weight percent, or the like) may be greater than or less than the dispersed phase weight percent. In the same or other embodiments, the foam 101 has a density of less than 1 g/cm$^3$. In some embodiments, a ratio of about 0.5 to 2.5 of the dispersed phase weight percent to the polymer matrix weight percent is utilized. It is appreciated that in general the ratio should be at a level effective to maintain structural integrity of the foam 101 provided by the polymer matrix. In other words, insufficient amounts of the polymer matrix may have detrimental effects on the mechanical properties of the foam 101.

In some embodiments, the dispersed phase includes at least one of chitin, starch, or cellulose. More specifically, ingredients for the dispersed phase may include at least one of (unprocessed or minimally processed) shellfish shells, wood flour, hemp, paper pulp (e.g., including broken down recycled paper), coconut husks, cornstarch, pea starch, tapioca powder, or the like. It is appreciated that the foam 101 has been made with all of the aforementioned dispersed phases, and that the ingredients for the dispersed phases are not mutually exclusive (e.g., the listed ingredients for the dispersed phase can be used individually and in combination). For example, the dispersed phase mentioned above may include all of the ingredients listed, which may each be included in the foam 101. In other embodiments, the foam 101 may include some or even only one of the listed ingredients for the dispersed phase.

It is appreciated that foams (e.g., the foam 101) made from chitosan, chitosan oligosaccharide, and chitin are biodegradable and have none of the toxic qualities of petroleum-based foams. The discovery of adding a chitosan-compatible dispersed phase to the foam 101 is a significant advancement in biodegradable foam technology because the properties of the foam can be tuned for a variety of applications. One can tune the pore size for example, by using a closed-mold during heating and changing the pressure inside the mold. By increasing the internal pressure, foams with smaller pore sizes can result. One can tune the density of the foam for example, by changing the dispersed phase weight percent and the amount of a blowing agent (less dispersed phase material and more blowing agent results in a lower foam density) and/or by optimizing the internal pressure and temperature of the closed-mold (lower pressure and higher temperature results in a lower foam density). Indeed, the dispersed phase may enhance the mechanical properties of the foam 101 by carrying part of applied loads (e.g., in tension, strain may be imparted to the dispersed phase in the foam such that the load is not carried entirely by the polymer matrix).

In some embodiments, a non-toxic (e.g., safe for human consumption, safe for human skin contact, not generally regarded as carcinogenic, or the like) plasticizer may be disposed in the polymer matrix of the foam 101 to impart a flexible character to the foam 101. Thus, the foam 101 may be deformed (e.g., compressed, bent, stretched, or the like) and return to its original form without breaking. In some embodiments, the non-toxic plasticizer may include low molecular weight polymers, polyols, alcohols, carbamide, or the like. In one embodiment, a polyol that is used as a plasticizer may be glycerol and a carbamide that may be used as a plasticizer may be urea. In some embodiments, the composition of the foam 101 further includes a plasticizer weight percent representative of the plasticizer included in the foam 101. In some embodiments, the plasticizer weight percent is greater than 0% but less than 1% (e.g., less than the alginate weight percent). In other embodiments, the plasticizer weight percent may range from 1% to 50% (e.g., the plasticizer weight percent may be less than the polymer matrix weight percent and the dispersed phase weight percent or the plasticizer weight percent may be greater than the polymer matrix weight percent and the dispersed phase weight percent). In some embodiments, the plasticizer weight percent may be greater than the alginate weight percent and the chitosan weight percent, but less than the dispersed phase weight percent. It is appreciated that the plasticizer weight percent may be tuned depending on the target flexibility of the foam 101. In the same or other embodiments, a dye or pigment may be added or otherwise included in the foam (e.g., added to precursor solutions that form the polymer matrix). It is appreciated that the dye (e.g., food colorings or other nontoxic dyes) or pigment (e.g., pigment powder) imparts a color (e.g., red, green, blue, yellow, orange, etc.) to the foam 101.

In some embodiments, the foam 101 may include a salt from reacted acid and base, which may be a sodium or calcium salt (e.g., sodium acetate, calcium acetate, calcium chloride, calcium carbonate, or the like). It is appreciated that the acid-base reaction may result in the generation of gas (e.g., $CO_2$), which may form the pores included in the foam 101. In some embodiments, the gas formed by the acid-base reaction may advantageously be used as the primary, or only, blowing agent for forming the foam 101.

Figures 2, 3:
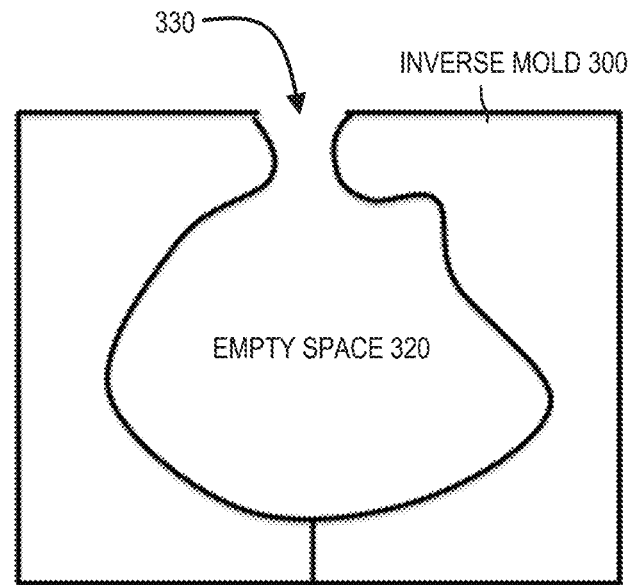
FIG. 2 illustrates a chemical structure that may be utilized to form a biodegradable foam, in accordance with embodiments of the present disclosure.
FIG. 3 illustrates an inverse mold for forming a biodegradable foam, in accordance with embodiments of the present disclosure.

FIG. 2 illustrates structure 205 that may be utilized to form a biodegradable foam, in accordance with embodiments of the present disclosure. The structure 205 is representative of either chitin or chitosan depending on a degree of deacetylation. Specifically, the structure 205 may correspond to a monomer of a polymer that can be characterized as chitin or as chitosan depending on the relative amounts of blocks X (with acetyl group) and block Y (with amine group) in the chain (which may be used in the foam 101 of FIG. 1), in accordance with an embodiment of the disclosure. A majority of composition of chitin, for example, comprises blocks X while a majority of composition for chitosan comprises blocks Y. Chitin can be deacetylated by replacing the N-acetyl-glucosamine group with an N-glucosamine (Y block) resulting in a more hydrophilic and positively charged polymer, which can be described as partially deacetylated chitin. Alternatively, acetylation of chitosan can yield a partially acetylated chitosan. When the ratio between acetyl and amine groups is higher than 1:1 (e.g., X>Y such that there is greater than a 50%/50% split of the two monomer units), the partially deacetylated chitin polymer may be referred to as chitin, when the ratio is lower, the partially acetylated chitosan polymer may be referred to as chitosan. Put another way, chitosan has 50% or more N-glucosamine groups (e.g., Y blocks), whereas chitin has more than 50% N-acetyl-glucosamine groups (e.g., X blocks). Chitosan oligosaccharide has the same molecular structure as chitosan as described, just with a lower molecular weight (fewer monomer units) than the polymers of chitin or chitosan. In some embodiments, the degree of deacetylation for chitosan included in the foam 101 illustrated in FIG. 1 is greater than 60% (e.g., 60%-100% Y blocks of structure 205), greater than 70% (e.g., 70%-100% Y blocks of structure 205), or greater than 80% (e.g., 80%-100% Y blocks of structure 205).

It is appreciated that the relative concentrations of the acetyl and amine groups in a polymer can be measure, for example, using techniques described in Shigemasa, et al., "Evaluation of different absorbance ratios from infrared spectroscopy for analyzing the degree of deacetylation in chitin," International Journal of Biological Macromolecules 18 (1996) 237-242, which is incorporated by reference as if fully set forth herein. The presence of certain chemical groups in the foam (e.g., foam 101 illustrated in FIG. 1) can be measured by at least one of Fourier-transform infrared spectroscopy, Raman spectroscopy, nuclear magnetic resonance spectroscopy, or the like.

In some embodiments, foam may be made as follows, in accordance with an embodiment of the disclosure. It is appreciated that the following description may be similarly represented, described, or otherwise included in the methods 900 and 950 illustrated in FIGS. 9A and 9B. One of ordinary skill in the art having the benefit of the present disclosure will appreciate that the steps listed may occur in any order and even in parallel. Moreover, steps may be added to, or removed from, the method in accordance with the teachings of the present disclosure.

Step 1 includes adding chitosan to a solution. In some embodiments, the solution includes an acid. In some embodiments, the solution including the acid has a pH of 3-6 (e.g., prior to adding the base). In some embodiments, it may be preferable to keep the pH at around 4.6 (e.g., a general range of pH 4-5), which is advantageous over processes involving extreme pH ranges that use bases like sodium hydroxide or potassium hydroxide since the processes here are much safer (e.g., no risk of burns and dangerous spills). The pH ranges recited here may be important in order to fully dissolve the chitosan or other constituent components included in the one or more components of a precursor foam. In one embodiment, the chitosan is dissolved in 0.175M M acetic acid (CH3COOH) solution at a concentration of 4% wt/v. However, in some embodiments, the acid may include at least one of acetic acid, formic acid, lactic acid, hydrochloric acid, nitric acid, sulfuric acid, or the like. In one embodiment, the solution may include water, a cosolvent (e.g., ethanol, methanol, etc.) with a lower boiling point than the water, and the acid. The low boiling point cosolvent may help reduce the time to dry the foam, since the solvent carrying the foam materials evaporates faster and at lower temperatures.

Step 2 includes adding a dispersed phase (e.g., a phase that is composed of particles that are distributed in another phase such as the polymer matrix) to the solution. In some embodiments, the dispersed phase includes at least one of chitin, cellulose, or starch. More specifically, the dispersed phase may include at least one of shellfish shells (e.g., minimally processed chitin), wood flour, paper pulp, hemp, coconut husks, corn starch, pea starch, and/or tapioca powder. In some embodiments, a chitin dispersed phase is added to the mixture (e.g., 0.5-2.5 wt ratio against chitosan dissolved in solution). In some embodiments the foam may not include the dispersed phase.

Step 3 includes adding a nontoxic plasticizer to the solution, where the nontoxic plasticizer imparts a flexible character to the foam. In some embodiments, the nontoxic plasticizer includes a polyol or low molecular weight polymer (e.g., polyethylene glycol, or the like). Glycerol is a polyol with three hydroxyl groups. It is a nontoxic compound that enhances water absorption. In some embodiments, glycerol or urea may be used as a plasticizer that is added to the chitosan-based foam formula to improve chitosan foam flexibility. The use of the plasticizer makes the foam more resistant to deformation and degradation from forces that stretch or compress the foam. When the initial deacetylated chitin (chitosan) solution in acetic acid is measured (e.g., 4% wt/v chitosan in in acetic acid solution), a volume percentage of glycerol (e.g., from 0.0001 vol % to 50 vol % of glycerol) can be added depending on the target foam flexibility. In some embodiments, depending on the specific formula for the amount of chitosan/glycerol in the mixture, the resulting foam may have a density ranging from 0.03 $g/cm^3$ to 1 $g/cm^3$. The foam may be less rigid than chitosan foams made without glycerol, and has a flexibility property similar to flexible polyurethane and expanded polypropylene, without any of the negative environmental drawbacks. However, as stated above, other plasticizers, preferably nontoxic, (e.g., other than glycerol) may be used in accordance with the teachings of the present disclosure.

Step 4 includes adding a base or salt to the solution after the chitosan and the dispersed phase is added to the solution to foam the mixture, which includes the chitosan and the dispersed phase. The base will react with the acid in the solution to produce gasses and foam the mixture. In some embodiments, the base includes at least one of sodium bicarbonate, sodium carbonate, or calcium carbonate. Thus, a salt may result in the foam from the reacted acid and base. In some embodiments, the salt may include a sodium or a calcium salt (e.g., sodium acetate, calcium acetate, or the like). However, one of skill in the art having the benefit of the present disclosure will appreciate that the salt may be any resultant salt from the acid/base combination used to prepare the foam (e.g., any salts that result from mixing the example bases and example acids disclosed herein). In one embodiment, sodium bicarbonate (1:1 mol ratio against acetic acid in the solvent system) may be used as the blowing agent and to neutralize the acid in the mixture, meaning there is no need to wash the foam since the blowing agent may neutralize the acid which increases safety, reduces processing steps, and reduces cost. However, one of skill in the art having the benefit of the present disclosure will appreciate that other bases or foaming agents (e.g., any chemical system to produce gasses in the mixture) may be used in accordance with the teachings of the present disclosure.

It is appreciated that in some embodiments, steps one through four may correspond to forming a foam precursor, which may not be processed into a foam with a two-step heating process to significantly reduce processing times, in accordance with embodiments of the present disclosure.

Step 5 includes heating the mixture, after adding the base, until the mixture (one embodiment of a foam precursor) has hardened into the foam. Heating may occur after vigorous mixing of the aforementioned ingredients. In some embodiments, the heating process may include heating the mixture in a closed or open mold via radiation to form a solid foam. In some embodiments heating the mold may involve the use of microwaves to generate the radiation.

Step 6 includes placing the solid foam in a convection oven or other radiative heat source after exposing the foam precursor to the radiation.

Step 7 includes applying a coating to the foam. In some embodiments, the coating may be applied to the foam by brushing, spraying, dipping, or the like with a deacetylated chitin (e.g., chitosan) solution (1-4% wt/v in 0.175M acetic acid solution). It is appreciated that the coating may be applied to all surfaces of the foam, which may then be dried in an oven or a dehydrator.

FIG. 3 illustrates an inverse mold 300 for forming a biodegradable foam, in accordance with embodiments of the present disclosure. As illustrated, the inverse mold is an open mold with opening 330 that leads to empty space 320 where the foam precursor may be input or otherwise inserted. However, in other embodiments, the inverse mold 300 is a closed mold without the opening 330. The cross-sectional view of the inverse mold 300 shows the empty space 320 in the center defining the foam shape to be made. The inverse mold 300 itself may be made with plastics, metals, ceramics, or the like. The inverse mold 300 may be split in half (along the line as illustrated) and the product extracted.

It is appreciated that extruders can be used to make polymer melts (an example of a foam precursor) and introduce gas into the solution as it is injected into a mold 300. The foam precursor fills the cavities of the mold (e.g., the empty space 320), therefore taking the shape of the product. Other foam molding techniques include foam-in-place, spraying, or continuous slabbing with post processing. However, creating molded pieces requires a molded die for the extruder, which may be expensive and may require conventional baking, which requires extensive post processing. Described herein is a novel, 2-step microwave assisted molding technique for foam made from any of the ingredients (and other ingredients not discussed).

In some embodiments, the inverse mold 300 of the product can be created using silicone, epoxy, metal or the like so the foam in the mold 300 forms the desired product by filling the empty space in the inverse mold 300. In some embodiments, the inverse mold 300 created should be larger than the desired product to account for shrinkage, and excess filler amounts can be used to provide more homogenous results. The inverse mold 300 can be filled with any chemical formula described elsewhere herein or other formulas not described. Using a 1200 W microwave, it was found that a decrease in cook time from 2-3 hours at 350° F. to 3-4 minutes at full power in the microwave could be achieved. It is appreciated that this was for chitosan-based foams with chitin, paper, and cornstarch material as the dispersed phase, but is applicable to other form formulations described herein. After microwaving the foam precursor to efficiently remove water molecules and nucleate the foam, the foam can be removed from the mold and a convection oven may be utilized to heat and stiffen the exterior structure of the foam. The two-step process of microwave assisted baking and then convection oven finishing provides a 40× faster process and conserves energy and resources. Additionally, since the method utilizes a mold, little post processing is required.

FIG. 4 shows a view 400 illustrating an example piece of foam 401 formed using a mold at a 2-step heating method, in accordance with embodiments of the present disclosure.

Figure 6A:
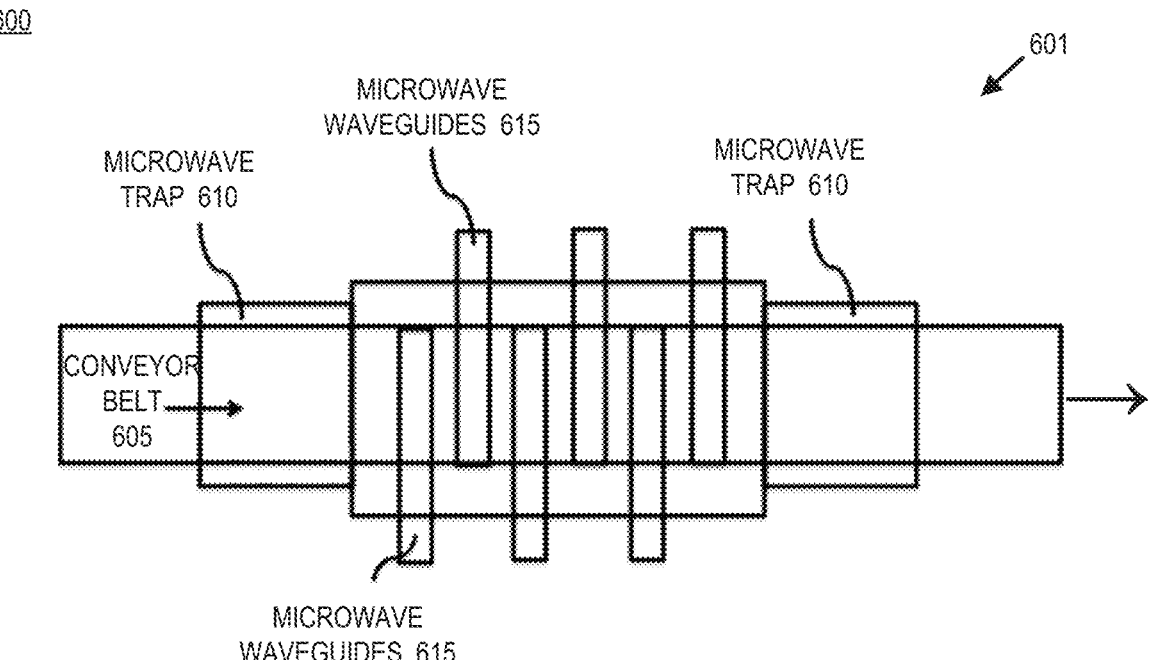
FIGS. 6A-6B respectively illustrate a top-down view schematic and side view schematic of an industrial tunnel microwave oven for forming biodegradable foam, in accordance with embodiments of the present disclosure.
Figure 6B:
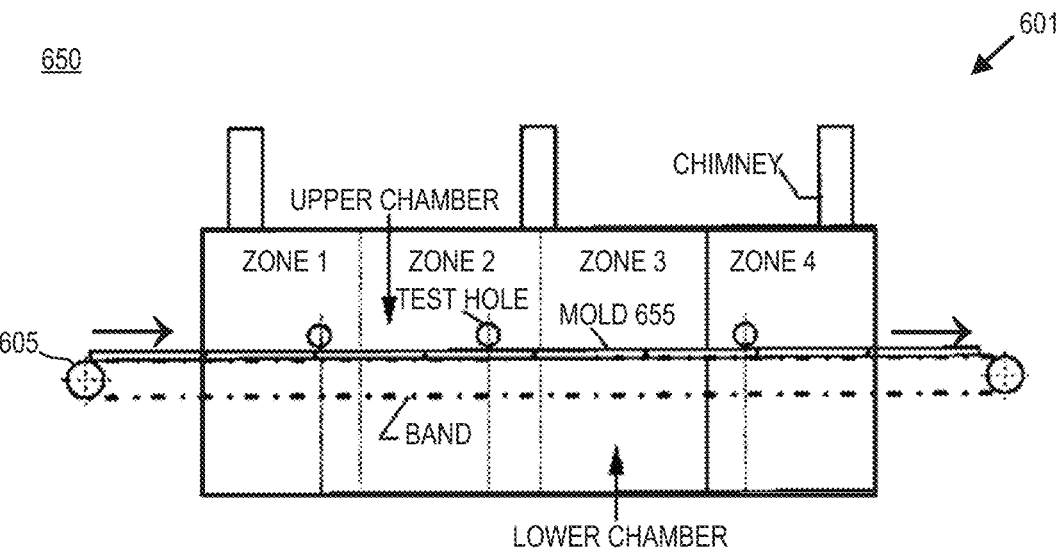

FIG. 5 illustrates a system 500 for foam production, in accordance with embodiments of the present disclosure. The system 500 includes mixer 505 (e.g., an extruder or mixing vat as respectively illustrated in FIGS. 7A-8), a mold and/or conveyor belt 510 (e.g., for shaping or continuously forming a foam from foam precursors), a radiation emitting system 515 (e.g., a microwave emitter as illustrated in FIG. 6A-6B), and an oven 520 (e.g., a convection over or otherwise). The mixer 505 is configured to output a foam precursor including one or more components, the one or more components including at least one of chitin, chitosan, or chitosan oligosaccharide. In some embodiments, the mixer 505 is further configured to receive the foam precursor including the least one of the chitin, the chitosan, or the chitosan oligosaccharide, a solvent included in the one or more components of the foam precursor, and a salt included in the one or more components of the foam precursor. In the same or other embodiments, the mixer 505 is further configured to receive at least one of a dispersed phase and a plasticizer included in the one or more components of the foam precursor. The mold and/or conveyor melt 510 is for shaping the foam precursor and/or taking the foam precursor into the radiation emitting system 515. The radiation emitting system 515 is positioned to receive the foam precursor from the mixer and expose the foam precursor to radiation to heat the foam precursor to form a solid foam. The oven 520 is positioned to receive the solid foam formed when the foam precursor is exposed to the radiation. In some embodiments, the oven 520 is configured to harden an exterior surface of the solid foam.

FIGS. 6A-6B respectively illustrate a top-down view schematic 600 and side view schematic 650 of an industrial tunnel microwave oven 601 for forming biodegradable foam, in accordance with embodiments of the present disclosure. It is appreciated that the industrial tunnel microwave oven 601 may be utilized to form the foam 101 illustrated in FIG. 1 and the foam 401 illustrated in FIG. 4. As illustrated in FIG. 6A, the industrial tunnel microwave oven 601 includes conveyor belt 605, microwave trap 610, and microwave waveguides 615. It is appreciated that the top-down schematic 650 of the industrial tunnel microwave oven 601 shows possible magnetron locations along the treatment zone and microwave traps 610 on either side for safety. The microwave waveguides 615 are placed to direct radiation (e.g., wavelength of 30 cm to 1 mm, such as approximately 12 cm) from the magnetrons towards the foam precursor and/or solid foam.

It is appreciated that in large-scale production, a consecutive industrial tunnel microwave and convection heating system would be used to produce molded foam as described in various embodiments of the disclosure. In some embodiments, the microwave zone may include a plurality of radiation emitting systems (e.g., magnetrons) that each output 1.2 kW at 2.45 GHz and the convection heating zone would provide heating of at least 350° F. (177° C.). In the depicted embodiment, six magnetrons are placed in the microwave tunnel, but additional or fewer radiation emitting systems may be used.

Because of their transparency to microwaves, plastic molds (or other materials transparent to the heating wavelength such as the mold 655 illustrated in FIG. 6B) would be filled with a liquid or semi-liquid foam solution (an example of a foam precursor) by an automatic dispenser (e.g., from an extruder or from a mixing vat) and fed into the tunnel microwave. In some embodiments, no mold may be used and the foam precursor (e.g., semi-dry foam) may be output (e.g., from an extruder) in a continuous sheet or other shape and into the radiation emitting system. As the mold is transported through the microwave tunnel, the solution would experience uniform microwaves that allow for constant dielectric heating of the polar molecules for 3-4 minutes. After the microwave treatment zones, the foam precursor would transform into a solid foam that would be removed from the mold 655 and transitioned into a convection oven for 5 minutes or another duration that allows for constant air circulation, which may result in a stiffer, more rigid packaging foam. It should be noted that the provided parameters of the tunnel microwave system can be modified, such as the wattage and number of magnetrons. The proposed 2.45 GHz microwave emitter may be used with foams where water is the primary solvent, however other frequency or wavelengths may also be utilized.

Figures 7A, 7B:
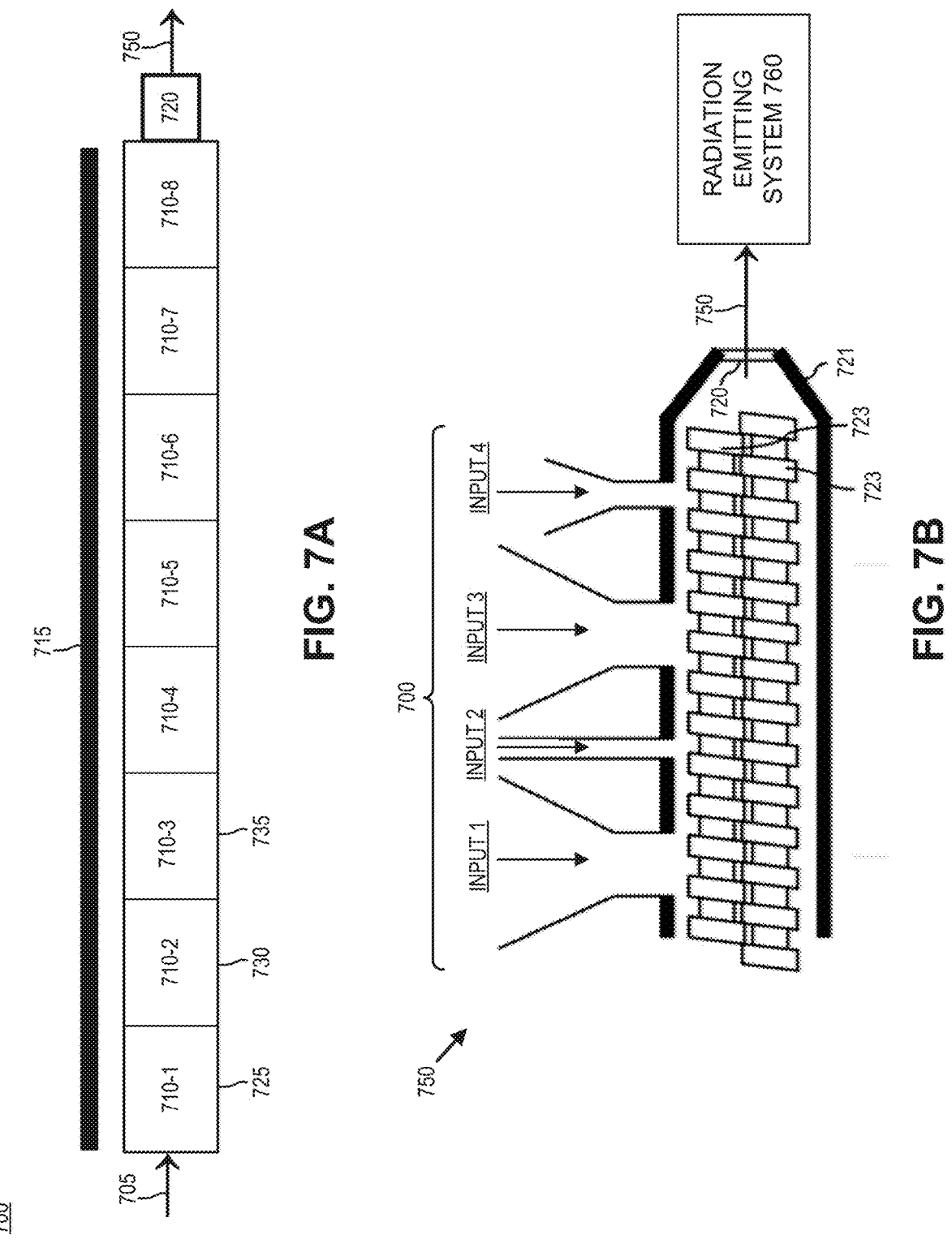
FIGS. 7A-7B illustrate example schematics for fabricating biodegradable foam using a mold and/or an extruder, in accordance with embodiments of the present disclosure.

FIGS. 7A-7B illustrate example schematics for fabricating biodegradable foam (e.g., the foam 101 illustrated in FIG. 1 and/or the foam 401 illustrated in FIG. 4) using a mold and/or an extruder, in accordance with embodiments of the present disclosure.

FIG. 7A illustrates extruder 700, which includes a plurality of modules 710 (e.g., a first module 710-1, a second module 710-2, a third module 710-3, and so on). It is appreciated that the plurality of modules 710 are not intended to be limiting as there may be more or less modules than the illustrated eight modules (e.g., 710-1 through 710-8). Additionally, it is noted that while the plurality of modules 710 are arranged in sequential order, there may be additional modules between adjacent modules, in some embodiments. For example, in one embodiment there may be one or more modules included in the plurality of modules 710 between the second module 710-2 and the third module 710-3. In the illustrated embodiment, input ingredients 705 (e.g., one or more components that are included in the foam precursor) are input into the extruder 700 for forming the extrudate 750 (e.g., foam precursor), which flow along the extruder 700 in the direction of the arrow 705 until the extrudate 750 is output. More specifically, the input ingredients for forming the extrudate 750 flows from a first end (e.g., proximate to the first module 710-1, the second module 710-2, and/or the third module 710-3) of the extruder 700 toward the second end of the extruder 700 (e.g., proximate to the extruder die 720 of the extruder 700) opposite the first end of the extruder 700. In some embodiments, the first module 710-1 is configured to provide a vent 725 to vent the extruder 700 at the first module 710-1 to atmosphere, the second module 710-2 is configured to input one or more solid feeds (e.g., solid components included in the one or more components of the foam precursor such as material forming the dispersed phase of the foam or any other solid component or ingredient of the foam precursor) via port 730, and the third module 710-3 is configured to input one or more liquid feeds (e.g., liquid components to feed into the extruder 700 that are included in the one or more components of the foam precursor). In some embodiments, it is appreciated that some or all of the one or more components of the foam precursor may be premixed (e.g., in mixing vat 800 illustrated in FIG. 8) before being input into the extruder.

In some embodiments, the second module 710-2 may be referred to as a solid input and the third module 710-3 may be referred to as a liquid input. As illustrated, the third module 710-3 is disposed between the second module 710-2 and the second end of the extruder 700 (i.e., the terminal end of the extruder 700 proximate to the extruder die 720). Additionally, the third module 710-3 is disposed between the first end and the second end of the extruder 700. It is appreciated that the one or more liquid feeds may be fed into the extruder 700 at the same location (e.g., one or more solutions fed at the same module location such as the third module 710-3 at the same or different times). In other embodiments, the one or more liquid feeds may be fed into the extruder 700 at different locations (e.g., the first solution is input at the third module 710-3 and the second solution is input at a later module such as the fourth module 710-4 at the same or different times).

In some embodiments, the extruder 700 may be a twin screw extruder and the barrel (e.g., the plurality of modules 710) of the extruder 700 may be heated between the first end and the second end (e.g., via heater 715). As illustrated, the mixture of components proceeded through the plurality of modules 710 may form the extrudate 750, which is passed through the extruder die 720 proximate to the second end of the extruder 700, which may impart a cross sectional shape to the foam precursor or otherwise facilitate inserting the foam precursor in a mold. However, it is appreciated that the extruder die 720 is an optional component and may be omitted in some embodiments such that the terminal end of the extruder 700 has no die or restriction through which the extrudate 750 passes.

FIG. 7B illustrates a system 750 which includes the extruder 700 illustrated in FIG. 7A and a radiation emitting system 760 for forming a foam (e.g., the foam 101 illustrated in FIG. 1 and/or the foam 401 illustrated in FIG. 4). Specifically, the illustrated embodiment of FIG. 7B, shows the extruder 700 as a twin screw extruder with screws 723 within a barrel 721 to output extrudate through the die 720. It is appreciated that in the illustrated embodiment, the modules are not individually labeled, but ports (e.g., inputs 1-4) leading to the screws 723 for inserting ingredients (i.e., the one or more components of the foam precursor) into the extruder 700 are shown, which may correspond to any of the ports (e.g., 725, 730, 735, or otherwise) illustrated in FIG. 7A.

In the illustrated embodiment of FIG. 7B, the one or more components of the foam precursor may be mixed in a continuous manner, and the foam precursor and/or the foam may be produced in a continuous manner as an extrudate. For example, the different liquids and solids (i.e., one or more components of the foam precursor) discussed herein may be input into the extruder 700 to form the extrudate 750 pushed out the die 720 at the end of the extruder 700.

Extrusion is a continuous process where materials are fed into the extrusion machinery, and extrudate (e.g., the extruded material product) is pushed out of the system in desired shapes. An extruder has several parts: feeders (e.g., inputs 1-4), extruder barrel 721, extruder screws 723, extruder drive, and die 720. Polymers, solutions, and/or other components included in the foam precursor may be fed into the extruder with a controlled gravitational feeder or pumps. The polymers are then transported from the start of the system along the screws (optionally at an elevated temperature) within, and along the length of, the barrel. As the polymers are moved along the barrel, various additives and blowing agents can be added into the system, as needed. This continuous movement allows materials to mix well, forming a uniform viscous mixture, which then goes through the die 720 at the end/output of the extruder 700. Extrusion manufacturing is a high throughput process. Depending on the specific die design (e.g., the shapes and dimensions of the opening that the materials will be pushed out of), the final extrudate 750 can be in various forms (e.g., rolls, tubes, sheets, planks, and other customized shape profiles). Compared to batch processing, extrusion is less expensive, and the extrudate 750 has consistent properties since batch-to-batch variances are eliminated.

In the illustrated embodiment, there are a plurality of separate input feeds (e.g., gravitational feeders) for solids and liquids (e.g., inputs 1-4). In some embodiments, the liquid feeds are driven by a pump, while solid feeds may be driven by gravity. These inputs 1-4 may be disposed along a length of barrel 721 at various intervals (e.g., with locations corresponding to the various modules 710 illustrated in FIG. 7A). In one embodiment, input 1 is configured as a solid feed to receive at least one of chitosan, chitosan oligosaccharide, or chitin, input 2 is configured as a liquid feed to receive a solution (e.g., an acidic solution including acetic acid or another acid where there is a 0.1-10% volume of acid to water), and input 3 is configured as a solid feed to receive chitin, starch, cellulose, or other dispersed phase materials, and input 4 is configured as either a solid or liquid feed to input a salt such as sodium bicarbonate or calcium carbonate. It should be noted that depicted is a cartoon cross section of a twin screw extruder that is not drawn to scale; indeed, the relative distances between input feeds, and length of screws 723 may be distorted, as actual dimensions are not amenable to illustration.

As shown the ingredients (described elsewhere herein) may be put into the extruder 700 and mixed by the screws 723 of the extruder 700 to output an extrudate 750 corresponding to the foam. As described in various embodiments of the invention, the extrudate may then pay input or otherwise received by the radiation emitting system 760 to proceed with the two-step heating cycle for changing the foam precursor into a solid foam that has been hardened. As shown the foam precursor ingredients (described elsewhere herein) may be put into the extruder 700, and the mixed foam precursor may be output from the extruder 700 as the extrudate 750. After extrudate may then be put into a mold and into the radiation emitting system 760 to form the final foam product by heating the solvent in the foam precursor.

FIG. 8 illustrates an example mixing vat 800, in accordance with embodiments of the present disclosure. As illustrated, the mixing vat 800 includes a vat 800 for holding the foam precursor 805, an agitator 810 for mixing the one or more components included in the foam precursor 805, and a spigot to output the foam precursor after mixing of sufficient intensity and duration to form a substantially homogeneous mixture. It is appreciated that the mixing vat 800 may be open or closed. In some embodiments, the agitator 810 may move (e.g., rotate or spin as illustrated) to mix the one or more components included in the foam precursor 805.

FIGS. 9A-9B illustrate example methods 900 and 950 of foam production, in accordance with embodiments of the present disclosure. It is appreciated that the methods 900 and 950 are possible methods for forming the foam 101 illustrated in FIG. 1 and foam 401 illustrated in FIG. 4 with a mold or extrusion system (e.g., extruder 700 illustrated in FIGS. 7A-7B), radiation emitting system (e.g., industrial tunnel microwave system 601 illustrated in FIGS. 6A-6B, radiation emitting system 760 illustrated in FIG. 7B), and/or a mixing vat (e.g., mixing vat 800 illustrated in FIG. 8). The example method 900 includes process blocks 905, 910, 915, and 920 while the example method 950 includes process blocks 955, 960, 965, and 970. It is appreciated that while the process blocks of the method 900 illustrated in FIG. 9A and method 950 illustrated in FIG. 9B are provided in a specific order, in other embodiments a different order of the process blocks may be utilized. Additionally, process blocks or steps may be added to, or removed from, the methods 900 and/or 950 in accordance with the embodiments of the present disclosure.

FIG. 9A illustrates method 900 of foam production, which shows process blocks 905, 910, 915, and 920 to form a biodegradable foam, in accordance with embodiments of the present disclosure. It is appreciated that the illustrated steps of FIG. 9A enables one to make biodegradable foam using the two-step heating process to significantly reduce the time (compared to conventional processing) necessary to make the biodegradable foam. However, one of skill in the art will appreciate that the steps may occur in any order and even in parallel. Additionally, steps may be added to or removed from the process in accordance with the teachings of the present disclosure.

Block 905 shows forming a foam precursor including one or more components. In some embodiments, the one or more components of the foam precursor includes at least one of chitin, chitosan, or chitosan oligosaccharide, which may form a polymer matrix of the resultant foam. In the same or other embodiments, the one or more components may include a solvent (e.g., at least one of water or acid that is responsive to radiation). In some embodiments, the one or more components of the foam precursor may include a dispersed phase or a plasticizer. In one embodiment, the dispersed phase includes at least one of chitin, starch, or cellulose. In the same or other embodiments, the dispersed phase includes at least one of shellfish shells, wood flour, hemp, paper pulp, coconut husks, cornstarch, pea starch, or tapioca powder. In some embodiments, the plasticizer includes at least one of urea, glycerol, or sorbitol. In one embodiment, the one or more components of the foam precursor includes a salt. In some embodiments, the salt includes at least one of sodium bicarbonate or calcium carbonate. In the same or other embodiments, the one or more components of the foam precursor may include an acid, an aqueous solution, and/or a base.

In some embodiments, forming the foam precursor includes acidifying an aqueous solution with an acid (e.g., at least one of acetic acid, formic acid, lactic acid, hydrochloric acid, nitric acid, or sulfuric acid), adding the at least one of chitin, chitosan, or chitosan oligosaccharide to the aqueous solution such that the acid at least partially dissolves the chitin, the chitosan, or the chitosan oligosaccharide, and adding a base or a salt to the aqueous solution. In some embodiments, the one or more components of the foam precursor may be mixed by an extruder system (e.g., extruder 700 illustrated in FIGS. 7A-7B) or a mixing vat (e.g., mixing vat 800 illustrated in FIG. 8). However, it is appreciated that in some embodiments, not all of the one or more components of the foam precursor may be dissolved by the acid (e.g., materials for the dispersed phase may not necessarily be completely dissolved by the acid). It is appreciated that upon forming the foam precursor, the mixture may be a liquid or others lack sufficient rigidity to form a three-dimensional shape or structure.

Block 910 illustrates inserting the foam precursor into a mold (e.g., mold 300 illustrated in FIG. 3) before exposing the foam precursor to radiation. In some embodiments, the mold may be formed or otherwise disposed on a conveyer belt for continuous processing. Since the foam precursor prior to radiation exposure lacks rigidity, the mold provides sufficient support to form a target shape of the foam with the foam precursor.

Block 915 shows exposing the foam precursor to radiation (e.g., via a radiation emitting system or microwave as illustrated in FIGS. 5-6B). In most embodiments, the radiation is of a wavelength to heat the foam precursor, or more specifically the one or more components included in the foam precursor (e.g., a solvent). In some embodiments, the solvent includes at least one of water or acid (e.g., at least one of acetic acid, formic acid, lactic acid, hydrochloric acid, nitric acid, or sulfuric acid) responsive to the radiation. In the same or other embodiments, the wavelength of the radiation is within a range of 30 cm to 1 mm. It is appreciated that by exposing the foam precursor to the radiation, the foam precursor may be heated (e.g., by evaporating at least some of the solvent or other liquid components included in the foam precursor) to form a solid foam that includes chitin, chitosan, or chitosan oligosaccharide and has sufficient rigidity to be removed from the mold without substantially destroying the shape or three-dimensional structure imparted on the solid foam by the mold. It is appreciated that the mold may be substantially transparent to the radiation such that that the radiation may propagate through the mold to reach the foam precursor to heat the foam precursor and form the solid foam. After exposing the foam precursor to the radiation to form the solid foam, the solid foam may be removed from the mold.

Block 920 illustrates inserting the solid foam into an oven after exposing the foam precursor to the radiation to harden an exterior surface of the solid foam. It is appreciated that in some embodiments, the solid foam may have a density of less than 1 g/cm$^3$. More specifically, the solid foam may be input into a convection oven to stiffen the exterior structure of the foam. It is appreciated that this two-step heating process that includes exposing the foam precursor to radiation followed by heating via a convection oven may result in significant time and energy savings relative to conventional approaches (e.g., a 40 times faster process that conserves energy and resources). In some embodiments, after the foam has been dried by the oven, a coating may be applied to the foam to enhance durability and/or moisture resistance as discussed previously.

FIG. 9B illustrates method 950 of foam production, which shows process blocks 955, 960, 965, and 970 to form a biodegradable foam, in accordance with embodiments of the present disclosure. It is appreciated that the illustrated steps of FIG. 9B enables one to make biodegradable foam using the two-step heating process to significantly reduce the time (compared to conventional processing) necessary to make the biodegradable foam. However, one of skill in the art will appreciate that the steps may occur in any order and even in parallel. Additionally, steps may be added to or removed from the process in accordance with the teachings of the present disclosure.

Block 955 shows outputting a foam precursor from an extruder (e.g., the extruder 700 illustrated in FIG. 7A). In some embodiments, the foam precursor may correspond to or otherwise have similar components as discussed in relation to block 905 of FIG. 9A or other embodiments of the foam precursor described within the present disclosure. As discussed previously, the foam precursor includes one or more components including at least one of chitin, chitosan, or chitosan oligosaccharide and a solvent.

Block 960 illustrates receiving the foam precursor from the extruder with a radiation emitting system (e.g., industrial tunnel microwave system 601 illustrated in FIGS. 6A-6B and/or the radiation emitting system 760 illustrated in FIG. 7B) positioned to expose the foam precursor to radiation. In some embodiments, the solvent included in the foam precursor includes at least one of water or acid responsive to a wavelength of the radiation. In the same or other embodiments, the wavelength is within a range of 30 cm to 1 mm.

Blocks 965 shows heating the foam precursor using the radiation. In some embodiments, the heating results in evaporating at least some of the solvent with the radiation to produce a solid foam including the at least one of the chitin, the chitosan, or the chitosan oligosaccharide. It is appreciated that in some embodiments and prior to exposing the foam precursor to the radiation, the foam precursor may be input into a mold. Specifically, the heating from the radiation may cause the foam precursor to become a solid foam disposed within the mold. The solid foam may then subsequently be removed from the mold.

Block 970 illustrates inserting the solid foam into an oven (e.g., a convection oven such as oven 520 illustrated in FIG. 5) after exposing the foam precursor to the radiation to harden an exterior surface of the solid foam. The second heating step using the oven may improve the mechanical properties of the foam by stiffening the foam to sufficient rigidity and provide final drying of the foam with reduced duration. It is appreciated that this two-step heating process that includes exposing the foam precursor to radiation followed by heating via a convection oven may result in significant time and energy savings relative to conventional approaches (e.g., a 40 times faster process that conserves energy and resources). In some embodiments, after the foam has been dried by the oven, a coating may be applied to the foam to enhance durability and/or moisture resistance as discussed previously.

FIG. 10 illustrates example products with a three-dimensional shape produced with the foam formed with the manufacturing techniques described in embodiments of the present disclosure. As illustrated, the products formed from the biodegradable foam (e.g., the foam 101 illustrated in FIG. 1 or the foam 401 illustrated in FIG. 4) may correspond to food packaging 1005 (e.g., a clamshell packaging), electronics packaging 1010 (e.g., a foam cut to hold cell phones), or sporting equipment 1015 (e.g., a surfboard blank).

The above description of illustrated embodiments of the invention, including what is described in the Abstract, is not intended to be exhaustive or to limit the invention to the precise forms disclosed. While specific embodiments of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of foam production, comprising:
providing a foam precursor including one or more components, the one or more components including at least one of chitin, chitosan, or chitosan oligosaccharide and a solvent;
exposing the foam precursor to radiation, wherein the radiation is of a wavelength to heat the foam precursor;
evaporating at least some of the solvent by heating the foam precursor using the radiation to produce a solid foam including the at least one of the chitin, the chitosan, or the chitosan oligosaccharide, wherein the solvent includes at least one of water or acid responsive to the radiation; and
inserting the solid foam into an oven, after exposing the foam precursor to the radiation, and heating the solid foam using a radiative heat source included in the oven to harden an exterior surface of the solid foam, wherein a density of the solid foam is less than 1 g/cm$^3$.

2. The method of claim 1, wherein the wavelength is within a range of 30 cm to 1 mm.

3. The method of claim 1, further comprising:
inserting the foam precursor into a mold before exposing the foam precursor to the radiation, wherein the evaporating causes the solid foam to have a shape based on the mold; and
removing the solid foam from the mold before inserting the solid foam into the oven.

4. The method of claim 1, wherein the one or more components of the foam precursor includes at least one of a dispersed phase or a plasticizer.

5. The method of claim 4, wherein the dispersed phase includes at least one of chitin, starch, cellulose, shellfish shells, wood flour, hemp, paper pulp, coconut husks, cornstarch, pea starch, or tapioca powder, and wherein the plasticizer includes at least one of urea, glycerol, or sorbitol.

6. The method of claim 1, wherein the one or more components of the foam precursor includes a salt, and wherein the salt includes at least one of sodium bicarbonate or calcium carbonate.

7. The method of claim 1, further comprising forming the foam precursor, including:
acidifying an aqueous solution with an acid;
adding the at least one of chitin, chitosan, or chitosan oligosaccharide to the aqueous solution such that the acid at least partially dissolves the chitin, the chitosan, or the chitosan oligosaccharide; and
adding a base or a salt to the aqueous solution.

8. A method of foam production, comprising:
outputting a foam precursor from an extruder, wherein the foam precursor includes one or more components, including at least one of chitin, chitosan, or chitosan oligosaccharide and a solvent;
receiving the foam precursor from the extruder with a radiation emitting system positioned to expose the foam precursor to radiation, wherein the radiation is of a wavelength to heat the foam precursor;
heating the foam precursor using the radiation to evaporate at least some of the solvent to produce a solid foam including the at least one of the chitin, the chitosan, or the chitosan oligosaccharide, wherein the solvent includes at least one of water or acid responsive to the radiation; and
inserting the solid foam into an oven, after exposing the foam precursor to the radiation, and heating the solid foam using a radiative heat source included in the oven to harden an exterior surface of the solid foam, wherein a density of the solid foam is less than 1 g/cm$^3$.

9. The method of claim 8, wherein the wavelength is within a range of 30 cm to 1 mm.

10. The method of claim 8, wherein the one or more components of the foam precursor further includes at least one of a dispersed phase, a plasticizer, or a salt.

11. The method of claim 10, wherein the dispersed phase includes at least one of chitin, starch, cellulose, shellfish shells, wood flour, hemp, paper pulp, coconut husks, cornstarch, pea starch, or tapioca powder, wherein the plasticizer includes at least one of urea, glycerol, or sorbitol, and wherein the salt includes at least one of sodium bicarbonate or calcium carbonate.

12. The method of claim 8, further comprising:
inserting the foam precursor into a mold prior to receiving the foam with the radiation emitting system, wherein the mold is transparent to the radiation; and
removing the solid foam from the mold prior to the inserting the solid foam into the oven.

* * * * *